Dec. 30, 1924.
B. M. W. HANSON
1,520,713
MILLING MACHINE
Filed June 17, 1922    8 Sheets-Sheet 1
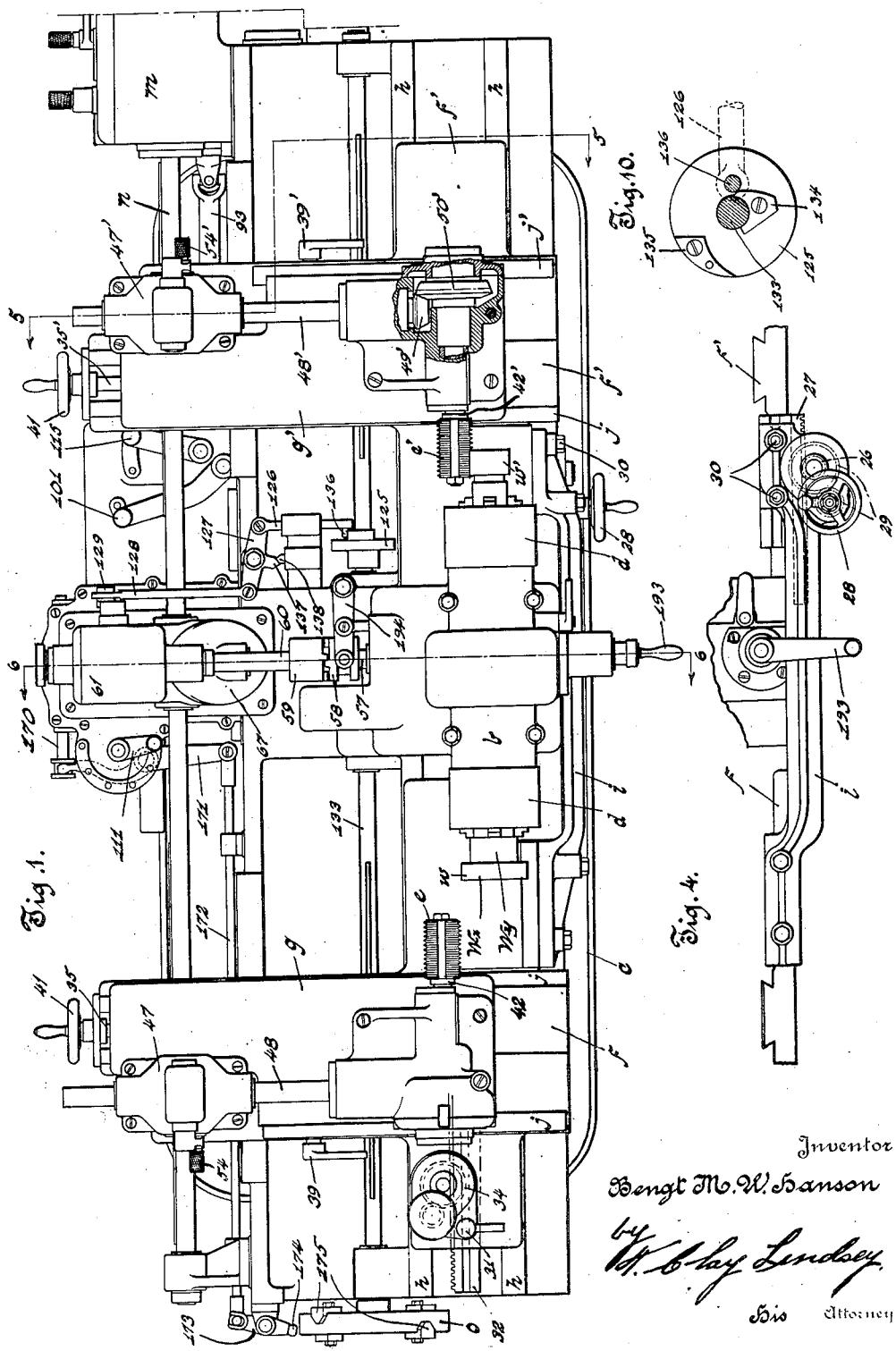
Inventor
Bengt M. W. Hanson
by W. Clay Lindsey
His Attorney

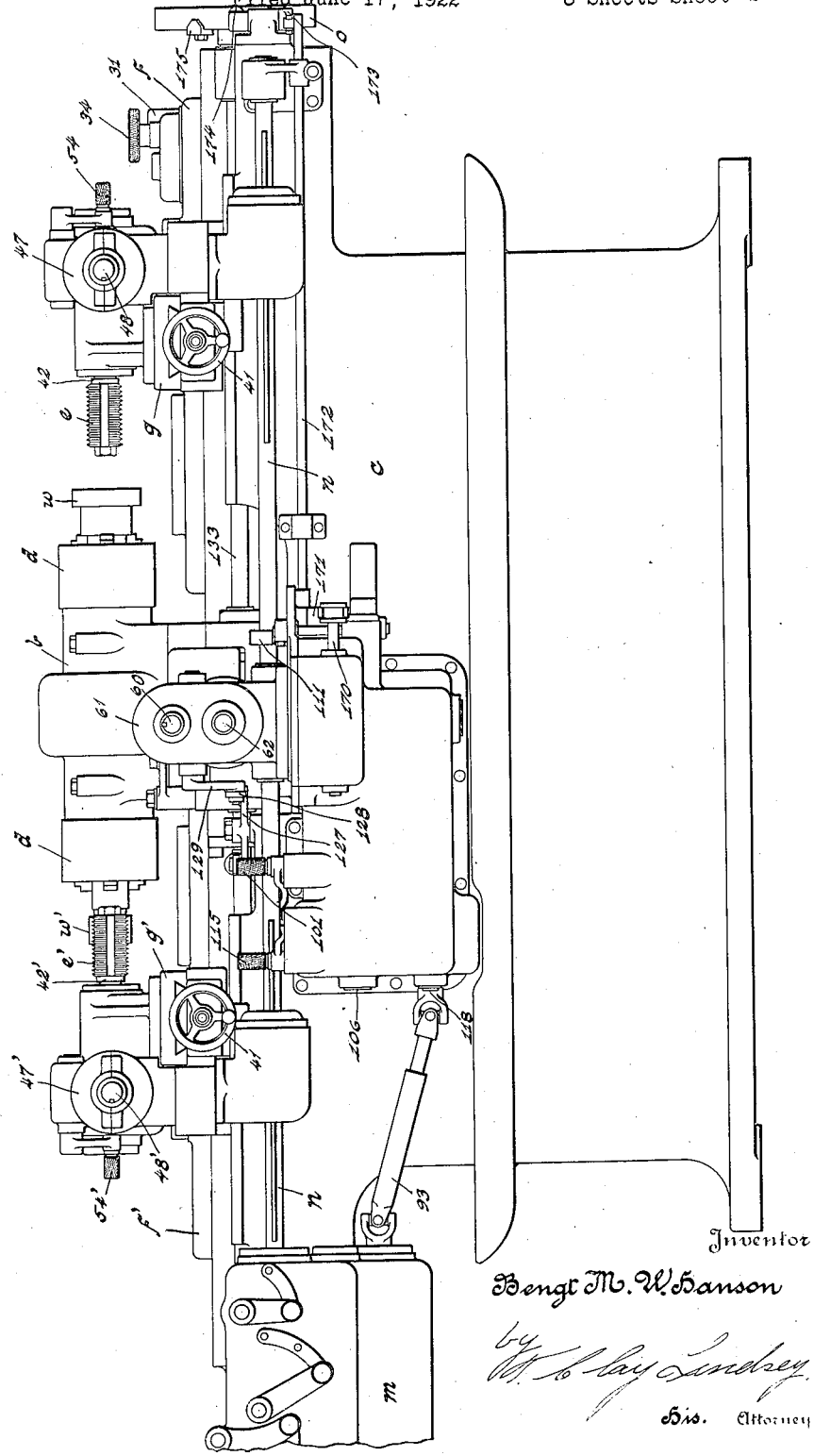

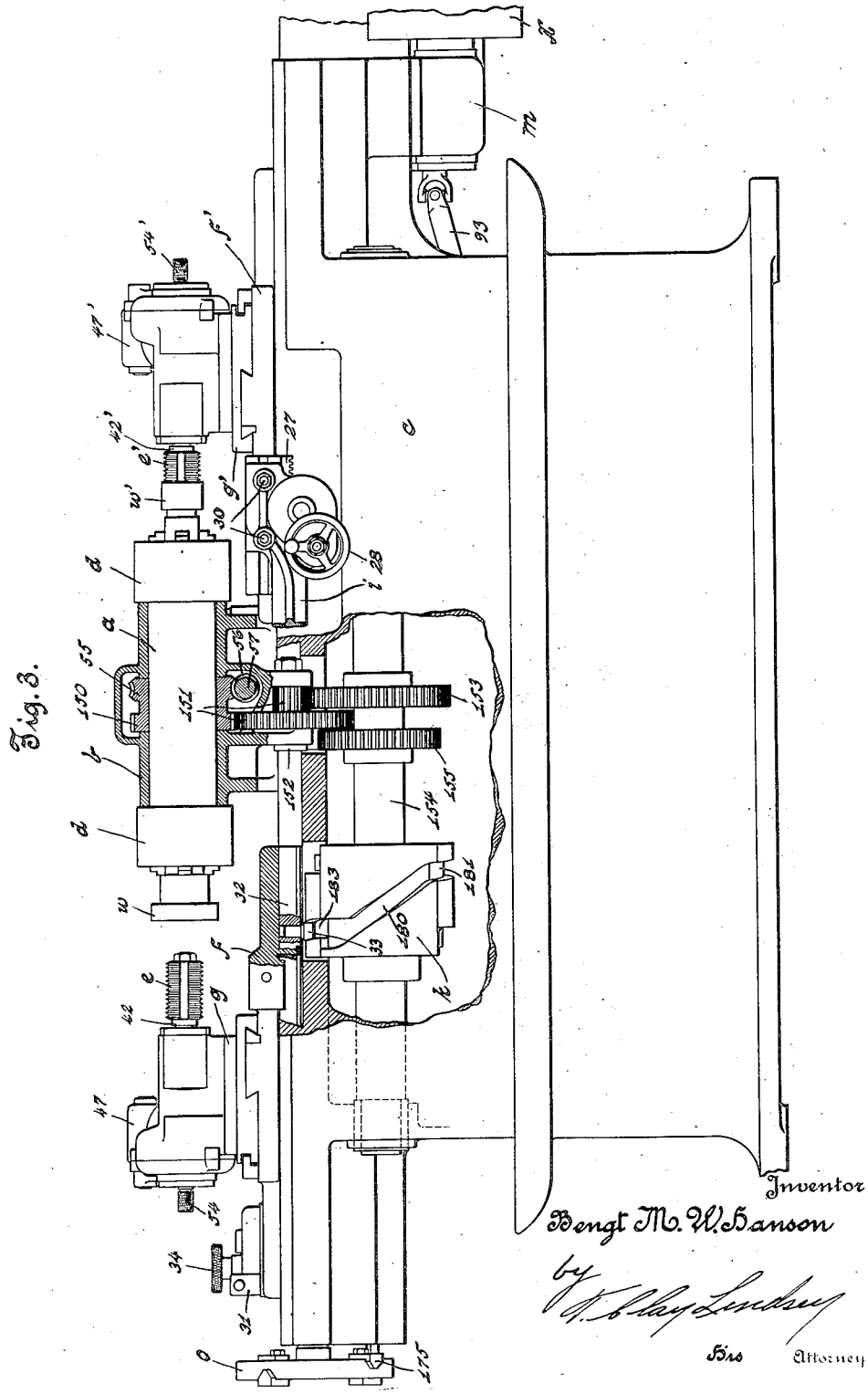

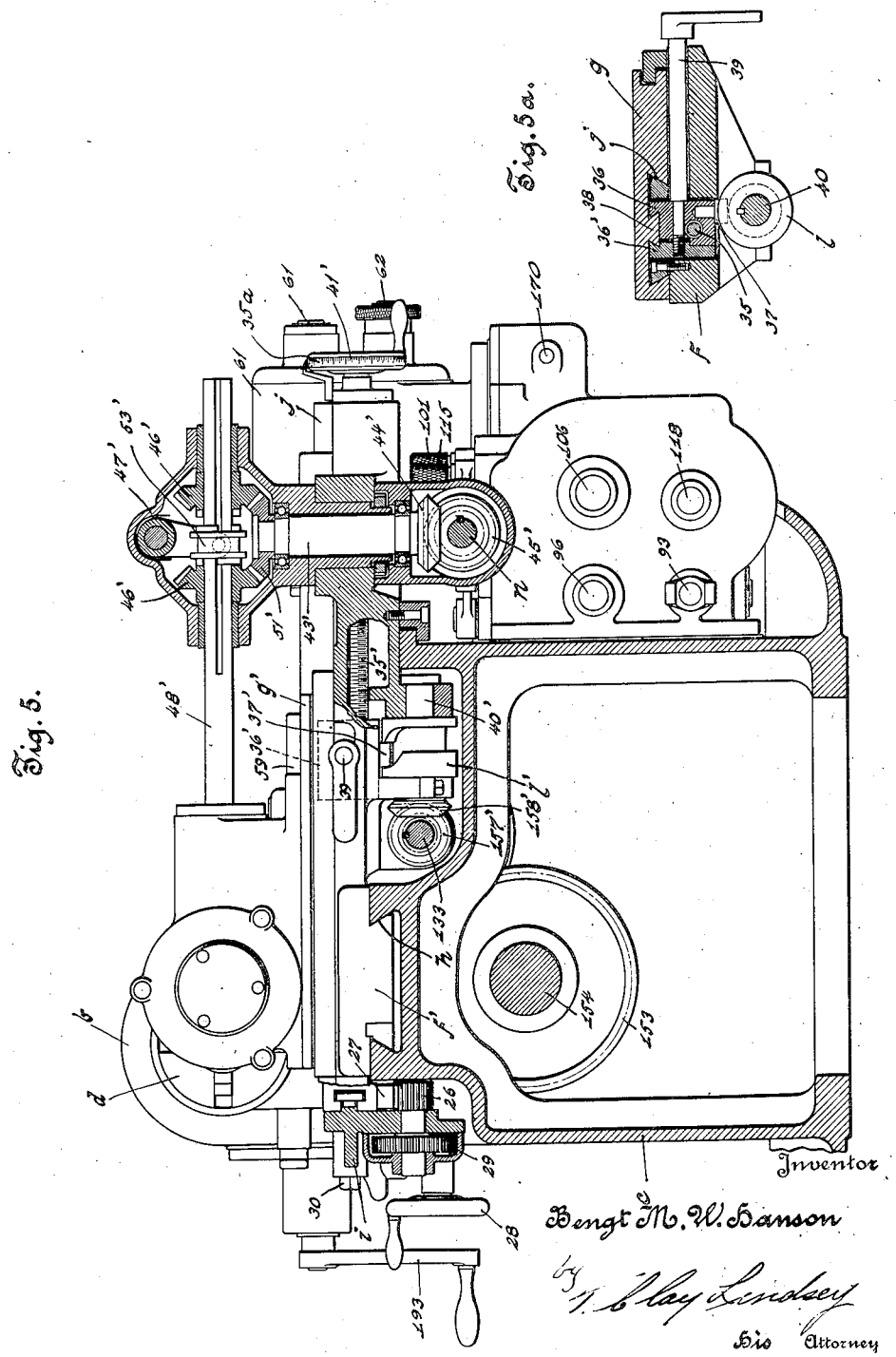

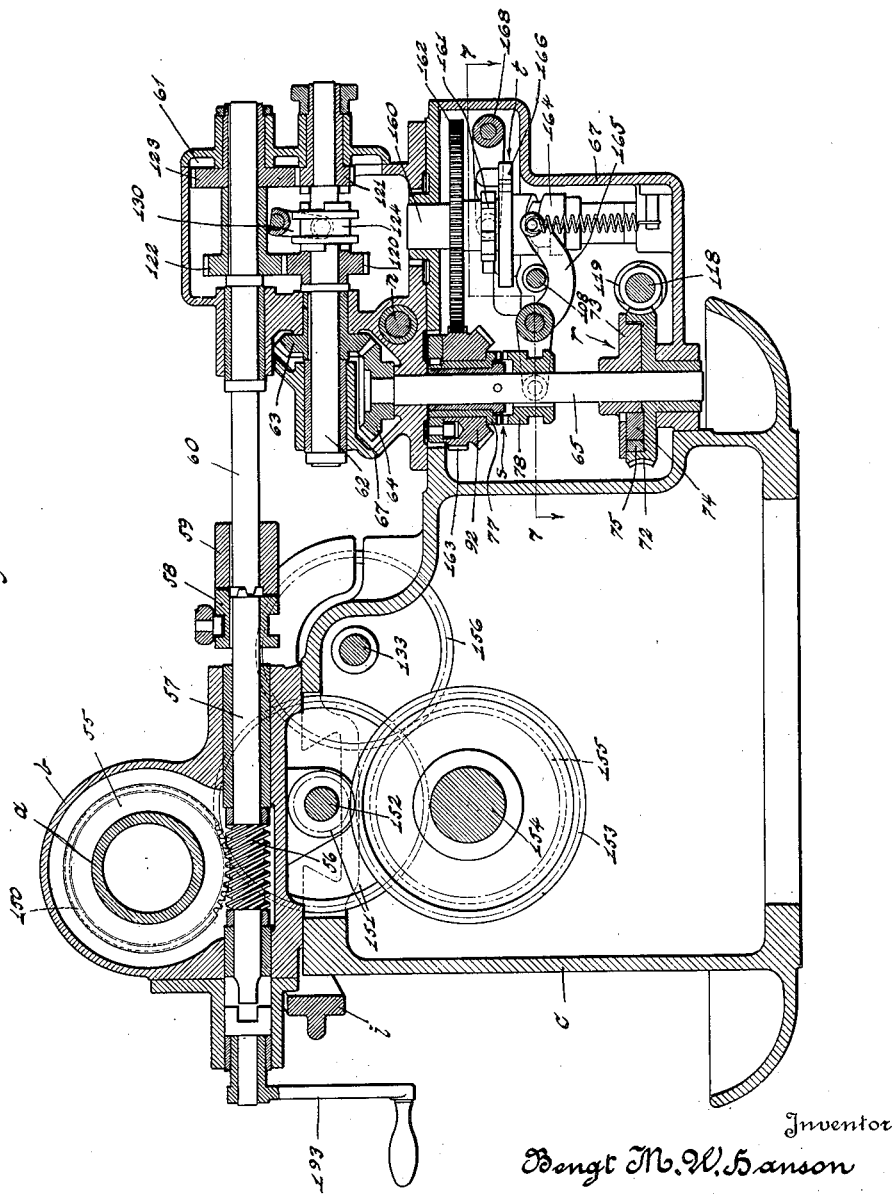

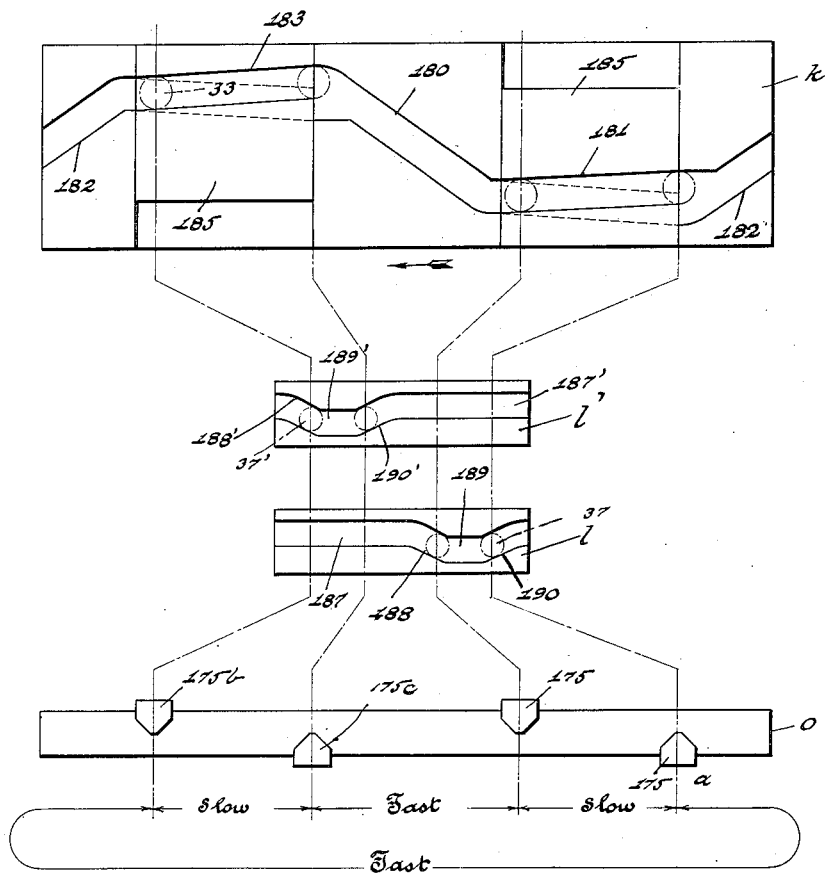

Dec. 30, 1924.
B. M. W. HANSON
MILLING MACHINE
Filed June 17, 1922
1,520,713
8 Sheets-Sheet 8
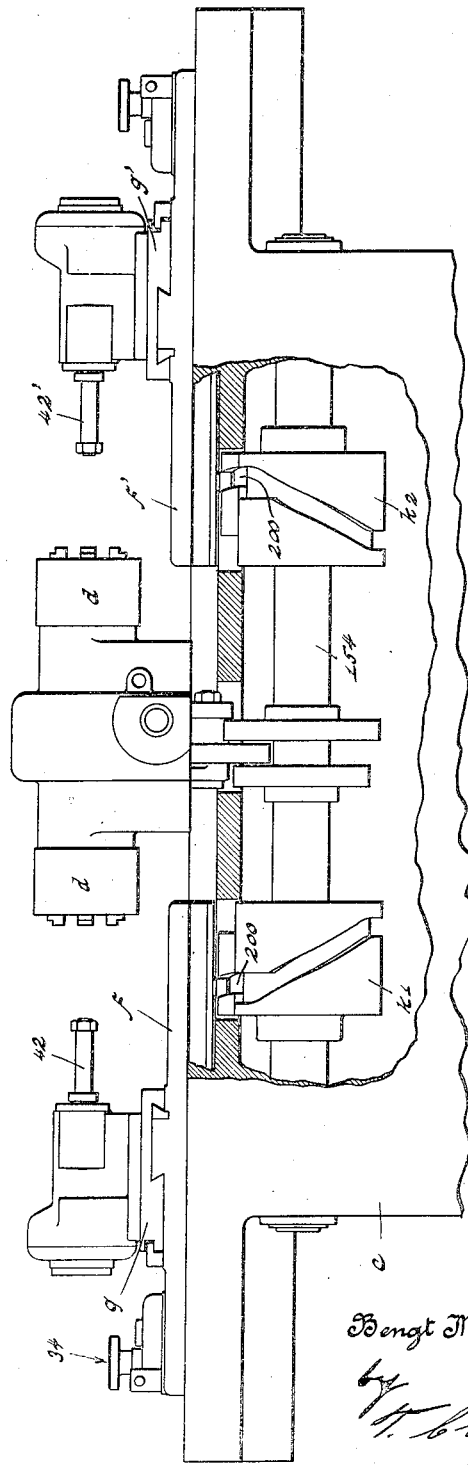
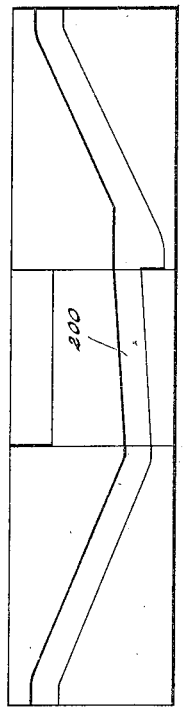
Inventor
Bengt M. W. Hanson
by
W. Clay Lindsey
His Attorney Patented Dec. 30, 1924.

1,520,713

UNITED STATES PATENT OFFICE.

BENGT M. W. HANSON, OF HARTFORD, CONNECTICUT.

MILLING MACHINE.

Application filed June 17, 1922. Serial No. 568,981.

*To all whom it may concern:*

Be it known that I, BENGT M. W. HANSON, a citizen of the United States, and a resident of Hartford, county of Hartford, State of Connecticut, have invented certain new and useful Improvements in Milling Machines, of which the following is a specification.

This invention relates to improvements in metal working machines, and more particularly to machines for milling screw threads and the like.

The aim of the invention is to provide a thread milling machine having various features of novelty and advantage which result in simplification in construction and economy in manufacture, and which increase the capacity or output and facilitate the operation of the machine.

One object of the invention is to provide a machine of this sort having a single rotary work spindle in fixed position with work holding devices at its opposite ends, and a pair of threading tools, such as hobs, one adjacent each end of the work spindle and in parallelism therewith, these hobs each being movable longitudinally and laterally relative to the pieces of work carried by the respective work holding devices, provision being made for controlling these movements with the greatest accuracy and with such speeds and in such sequence that the threading operations are carried out with precision and with a minimum loss of time.

Further, the machine is very flexible or universal in its application in that by its use internal or external threads, or right or left handed threads of various kinds, diameter, or pitches, may be milled.

The arrangement is such that the operator of a machine may readily insert the pieces of work to be operated upon in the chucking devices without danger of injury and the parts, which are of simple construction, are assembled in a very compact manner so that they may be adjusted and controlled with facility.

I desire it to be understood that the present disclosure is by way of exemplification only, that the invention is susceptible of various modifications and embodiments and that the terms here used are merely terms of description and not terms of limitation. It will further be understood that various features of the construction are susceptible of modification to suit different requirements without departing from the spirit of the invention.

The above and other objects of the invention are obtained in the machine illustrated in the accompanying drawings wherein:—

Fig. 1 is a top plan view of the entire machine;

Fig. 2 is a rear view thereof;

Fig. 3 is a front view with parts broken away for the purpose of clearness;

Fig. 4 is a detail view showing in front elevation the connection between the carriages for the hobs;

Fig. 5 is a sectional view taken substantially on line 5—5 of Fig. 1;

Figure 7:
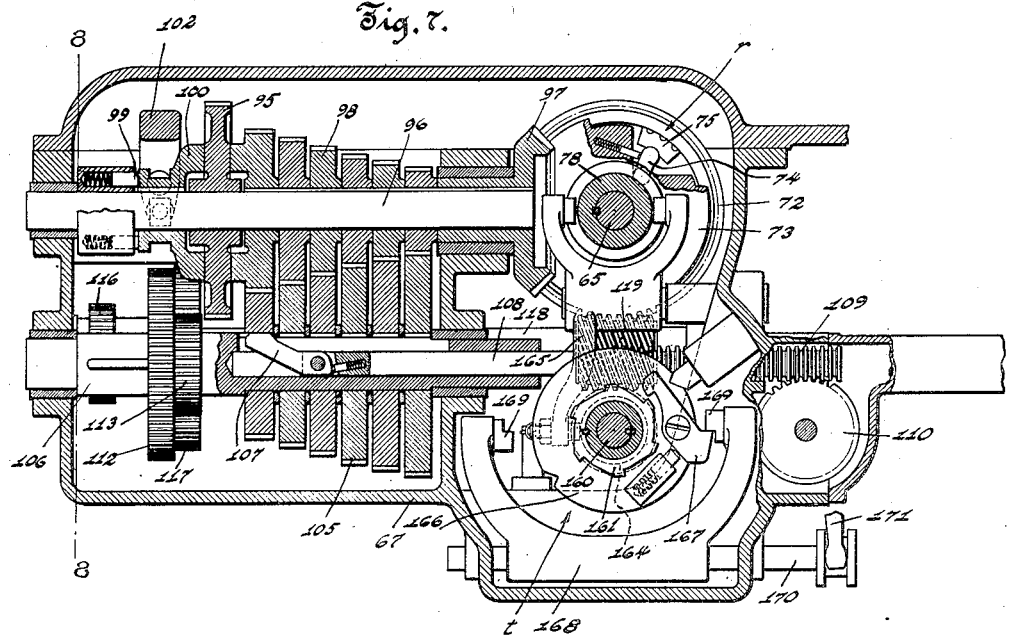
Figure 8:
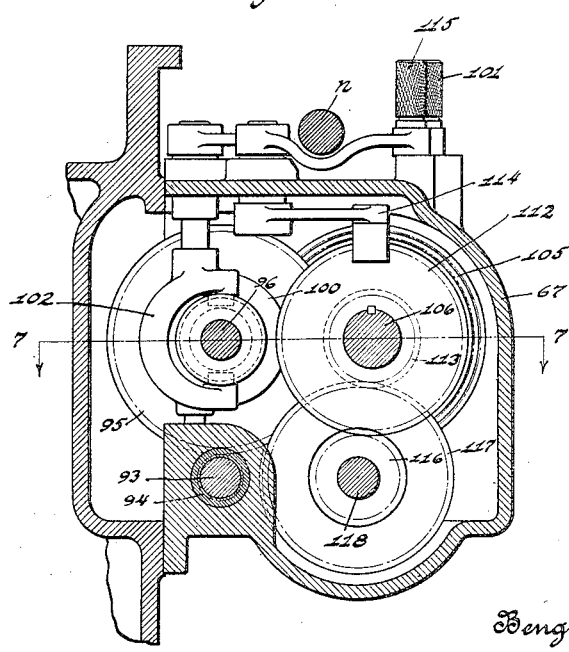

Fig. 5ª is a detail view in section and illustrates the manner in which the cross slides carrying the hobs may be adjusted relative to the cams which move these slides;

Fig. 6 is a view taken substantially on line 6—6 of Fig. 1;

Fig. 7 is a view in horizontal section taken substantially on lines 7—7 of Figs. 6 and 8 and shows, in part, the mechanism through which the work spindle and other parts of the machine are driven and controlled;

Fig. 8 is a transverse section taken on line 8—8 of Fig. 7;

Fig. 9 is a view showing diagrammatically the relation of the tappet wheel and the cams which control movement of the tool carriages;

Fig. 10 is a detail view of a cam for automatically changing the speed of rotation of the work spindle;

Fig. 11 is a view similar to Fig. 3 but showing a slightly different embodiment of the invention; and, Fig. 12 is a view of one of the cams, $k^1$ or $k^2$, employed in the embodiment disclosed in Fig. 11.

A brief statement of the general construction and operation of the machine will first be given so that the following detailed description will be more readily understood.

The machine involving the present invention is provided with a work spindle $a$ rotatably supported in a fixed or stationary bearing or housing $b$ mounted centrally and forwardly on the top of a suitable base or pedestal $c$ of any desired construction. The spindle $a$ is provided at each end with a suitable work holding device, such as a collet or chuck $d$. These devices, in the present disclosure, are not shown in detail as they may be of any usual or desired construction. The machine is further provided with a pair of thread forming tools, which may be in the form of hobs *e*, *e'*, one to each end of the spindle and arranged to respectively operate on the pieces of work carried thereby. It will be seen that the hobs are in parallelism with each other and with the axis of the work spindle and they are longitudinally spaced apart with the work spindle interposed between them. Each of the thread forming tools or hobs *e*, *e'* is rotatably mounted on a suitable carriage, each carriage including a pair of superimposed slides *f* and *g*. For convenience, like numerals indicate like parts of the two tool carriages, except that the numeral applied to the right hand carriage and the parts associated therewith are primed. One of the slides of each carriage, in the present instance the lower or main one *f*, is movable lengthwise of the work spindle on longitudinally extending ways *h* on the top of the base *c*, and the other or upper slide is movable laterally on the cross ways or gibs *j* provided on the top of the main slide *f*. In that embodiment of the invention shown in Figs. 1 to 10 inclusive, the main slides *f*, *f'* of the tool carriages are adjustably connected together by means of a yoke or connecting bar *i* so that they move in unison. The carriages, together with the tools mounted thereon, are reciprocated longitudinally of the work spindle through the instrumentality of a cam *k*. The cross slides *g*, *g'*, together with the respective hobs mounted thereon, are moved so as to feed the tools laterally or radially up to and into and out of and away from the respective pieces of work by cams *l*, *l'*. The thread forming tools or hobs are continuously driven at the desired speeds, depending, for instance, upon the kind of work operated upon, through suitable selective speed mechanism mounted within the gear box *m*, the common shaft *n* and the connections shown most clearly in Fig. 5. The drive mechanisms of the machine are initially driven by means of a pulley *x* (Fig. 3) about which passes a belt, not shown. The work spindle *a* is driven through suitable speed controlling mechanism, parts of which are shown in Figs. 6, 7 and 8, and this mechanism is automatically controlled by a tappet wheel *o* which, together with the cams *k* and *l*, *l'*, are connected up to, so as to be driven at a constant ratio of speeds with said work spindle. This speed controlling mechanism and the control therefor are so arranged and adjusted that the work spindle, together with the tappet wheel and cams *k*, *l*, *l'*, is driven at a relatively fast rate of speed while the hobs are being moved up to and out of operative relation to the work, and at a selected slow rate of speed during the threading operations.

After the machine has been properly set up and the power thrown on, its operation, in brief, is as follows:—

Assuming that the right hand hob *e'* has just completed its threading operation on the right hand piece of work designated by the letter W', a tappet on the tappet wheel *o* now comes into play to so actuate the speed controlling mechanism that the speed of rotation of the work spindle, together with the tappet wheel and the cams *k* and *l*, *l'* will change from a selected slow speed to a fast speed whereupon the cam *l'* associated with the right hand hob will quickly withdraw this hob laterally from the work W'. The cam *k* then quickly moves the tool carriages *f*, *f'* longitudinally of the hobs so as to carry the right hand hob *e'* out of operative relation to the right hand piece of work W' and bring the left hand hob *e* into longitudinally operative relation to the left hand piece of work W. As the left hand hob reaches the limit of this quick forward stroke, the cam *l* associated with this hob quickly moves the left hand cross slide *g* to bring the hob mounted thereon radially up to the work W. At this time, a tappet on the tappet wheel actuates the clutch which controls the speed of rotation of the work spindle whereupon this spindle, together with the tappet wheel and the cams *k* and *l*, *l'*, will be slowly driven, the result being that the tool carriages are slowly moved in a direction longitudinally of the work in accordance with the desired pitch of thread to be cut and the cross slide *g* carrying the left hand hob is slowly moved radially so as to feed the tool into the work to the desired depth of the thread to be cut and thereafter the left hand cross slide *g* remains stationary on its main slide *f* while the latter continues the slow movement forward a distance equal to the desired pitch of the thread. The tool is in engagement with the work during such time that the work makes about one complete revolution and when the threading operation is completed, another tappet throws the speed controlling mechanism for the work spindle, whereupon this spindle, together with the tappet wheel and the cams, will be rotated at a fast speed resulting in a quick radial withdrawl of the left hand hob *e* from the work and a quick longitudinal movement of the hobs so as to now bring the right hand hob *e'* into longitudinal operative relation to a new piece of work, which has been inserted in the right hand work holding device *d* of the spindle while the piece of work W was being threaded. After the right hand hob is thus brought into longitudinal relation to the work, it is quickly moved radially up to the work, then slowly into the work to the desired depth while being moved longitudinally in accordance with the pitch of the thread to be cut.

Reference will now be made to the detail construction of the machine herein disclosed by way of exemplification. The arrangement of the tool carriages and the manner in which the tools are driven will first be described. The main slides $f$, $f'$ of the two tool carriages are adjustably connected together by a bar or yoke $i$. One end of this yoke is rigidly fixed to the left hand slide $f$. As shown most clearly in Figs. 4 and 5, journalled in the right hand end of the yoke $i$ is pinion 26 meshing with a rack 27 on the slide $f'$ and this pinion 26 is adapted to be turned by a wheel 28 acting through pinions 29. The yoke $i$ is adapted to be clamped or secured in adjusted position to the slide $f'$ by screws 30. The left hand slide $f$ as is clear from Figs. 1 and 3, is provided on its under side with an adjustable bar 32 carrying a follower 33 which works in the cam groove of the cam $k$. This bar 32 is adjustably connected to the slide $f$ through an arrangement, designated generally by the numeral 34, which may be similar in construction and operation to the adjustable connection between the yoke $i$ and the right hand slide $f$. 31 is a clamping screw. In setting up the machine, the left hand hob $e$ is longitudinally adjusted relative to the cam $k$ (depending upon the extent which the piece of work W extends beyond the left hand end of the spindle $a$) by turning the hand wheel or knurled nut of the arrangement 34, and then the right hand hob $e'$ is longitudially adjusted by turning the hand wheel 28 to bring the right hand hob into proper relation to the piece of work W' carried by the right hand chuck $d'$.

Each of the cross slides $g$, $g'$ is adjustable relative to its cam $l$, $l'$ crosswise on its respective main slide $f$, $f'$ so as to adjust the hobs laterally in accordance with the diameters of the pieces of work to be operated upon, through the arrangement shown most clearly in Figs. 5 and 5ª. As there illustrated, there is journalled in each of the main slides, against longitudinal movement, a screw 35 having threaded engagement with a nut or block 36 carrying a follower 37 working in the cam groove of the cam $l$ or $l'$ which cam is fixed on a pin 40 journalled in suitable bearing depending from the main slide. The block is in two parts 36 and 36' which are clamped to a dove tail gib 38 on the bottom of the cross slide $g$ by a clamp bolt 39. With this arrangement it will be seen that to adjust a cross slide, the clamping bolt 39 associated with that slide is loosened, the screw 35 is operated by means of the hand wheel 41 to move the cross slides to the proper position, and then the bolt is turned to clamp the nut 36 to the gib 38.

The tool spindles 42, 42' are driven from the common shaft $n$ extending along the back of the machine through similar connections which are as follows. As previously stated, this shaft $n$ is driven through suitable selective speed gearing within the gear box $m$. Each of the main slides $f$, $f'$ adjacent its rear end, is provided with a vertical bearing in which is mounted a shaft 43 carrying on its lower end a bevel gear 44 meshing with a gear 45 splined for sliding movement to the shaft $n$. On the upper end of the shaft 43 is a bevel gear 51 meshing with a pair of opposed gears 46 journalled in a housing 47 and slidably receiving the shaft 48, the forward end of which carries a bevel gear 49 meshing with a gear 50 secured to the tool spindle 42. The opposed faces of the gears 46 are provided with clutch teeth and between these gears and fixed to the shaft 48 is a slidable clutch sleeve 53 and adapted to be thrown into engagement with either of the gears 46 through the manual operation of handle or lever 54. The purpose of providing each of the drives for the hobs with a reversing clutch, including the gears 46 and the clutch sleeve 53, is to change the direction of the rotation of the hobs, at will, depending on whether internal or external threading is to be done. In the embodiment disclosed in the drawings, the tool spindle is always driven in the same direction, but if desired provision may be made for driving the work spindle in either direction, in which event the reversing clutches or mechanisms for the tool spindles may or may not be omitted.

Reference may now be made to the manner of driving of the work spindle $a$. Fixed to the work spindle $a$ is a worm wheel 55 with which meshes the worm 56 formed on the shaft 57 to the rear end of which is fixed, for sliding movement, a clutch member or sleeve 58 adapted to be moved in and out of engagement with clutch member 59, fixed to a shaft 60, which shaft, in effect is a continuation of the shaft 57 when the clutch parts 58 and 59 are in engagement. The shaft 60 is driven through a change speed gearing designated generally by the numeral 61 from a shaft 62 carrying a gear 63 with which meshes a gear 64 on a vertical shaft 65 rotatably supported within a housing 67. Provided on the lower end of shaft 65 is an over running or one way clutch $r$ through which the work spindle is driven at relatively low selected speeds. This clutch which is a well known type, includes a worm wheel 72 loose on the shaft 65, and a disc 73 fast on that shaft and carrying, as shown in Figs. 6 and 7, a link 74 and friction shoe 75. The arrangement of this clutch is such that when the shaft 65 and the disc 73 fixed thereto are driven at a greater speed than the worm wheel 72, the shoe will ride free of the latter, but when the shaft is not driven at a greater speed, the shoe is wedged against the worm wheel causing the wheel and shaft to rotate together. The shaft 65 is also provided with clutch *s* comprising a sleeve 77 loose on the shaft and a slidable sleeve 78 keyed to the shaft. The sleeve 78 is moved in and out of the clutching engagement with the sleeve 77 by an escapement clutch mechanism *t*, the operation of which is controlled by the tappet wheel *o* as hereinafter described more in detail.

Fixed to the loose sleeve 77 of the clutch *s* is a bevel gear 92 which is constantly driven at a uniform rate of rotation as follows:— Leading from the transmission box *m* is a constantly driven shaft 93 provided with a pinion 94 meshing with a larger gear 95 on an intermediate shaft 96 to which is fixed a bevel gear 97 meshing with the gear 92, which as stated, is fixed to the clutch sleeve 77. In the present illustrated disclosure, the large gear 95 forms part of a friction clutch, it being normally held in frictional engagement with a stepped gear 98 by suitable spring pressed plungers 99 acting through a sleeve 100. This sleeve 100 may be withdrawn from frictional engagement with the gear 95 by means of a handle 101 working through a yoke 102. This friction clutch is thrown out when it is desired to shift the gears within the transmission box *m*.

The worm wheel 72 of the clutch *r* is constantly rotated at any desired selective speed within a given range in the following manner:—Fixed to the shaft 96 is the cone or stepped gear 98 meshing with a plurality of gears 105 loose on shaft 106. The gears 105 are selectively fixed to the shaft 106 by a pawl 107 connected to a rod 108 slidably mounted within the shaft 106. The rod has a rack 109 with which meshes a toothed disc 110 adapted to be rotated by throwing a handle 111. Splined on the shaft 106 are a large gear 112 and a small gear 113 adapted to be shifted by means of a fork 114 and a handle 115. The gears 112 and 113 are arranged to mesh respectively with a small gear 116 and a large gear 117 on a shaft 118 which carries a worm 119 meshing with the worm wheel 72 of the clutch *r*.

It will be seen that with the arrangement of gearing described, the gear 92 together with the clutch sleeve 77 is constantly rotated at a uniform speed through the shaft 93, intermeshing gears 94 and 95, the shaft 96 and the bevel gear 97. The selected speed at which the tool spindle is to be driven is obtained by swinging the handle 111 to fix the proper gear 105 to the shaft 106, and by moving the handle 115 to shift the gears 112 and 113. The drive of the worm wheel 72 of the clutch *r* is then through the constantly driven stepped gears 98, the gears 105 which are selectively fixed to the shaft 106, the intermeshing gears 112, 116 (or 113, 117 as the case may be), the shaft 118 and the worm 119.

It is understood, of course, that the speed of rotation of the work spindle should be selected in accordance with the diameter of the thread to be formed; the smaller the diameter of the work, the greater should be the speed of rotation of the spindle. In some instances it may be desirable to have one of the hobs operate on pieces of work of one diameter and the other hob on pieces of work of a different diameter, for instance, one hob may be used to first mill threads of a large diameter on pieces of work and the other hob may be employed to form threads of smaller diameter on the same or other pieces of work, or one of the hobs may be employed to mill an external thread and the other hob to cut an internal thread of a different diameter. In order to obtain the proper selective speeds for the work spindle when it is desired to use the two hobs for cutting threads of different diameters, means is provided for automatically changing the rotation of the spindle from one selected speed to another between successive threading operations.

As shown in Fig. 6 the shaft 62 is provided with a pair of loose gears 120 and 121 of different diameters and these gears respectively mesh with gears 122 and 123 fixed to the shaft 60. A slidable clutch sleeve 124 fixed to the shaft 60 is thrown from one extreme position to the other to alternately fix the gears 120 and 121 to the shaft 62 by a cam 125 (shown in Fig. 10) acting through the slidable pin 126, lever 127, link 128, lever 129 and yoke 130, as most clearly shown in Figs. 1 and 10. Cam 125 is mounted on the tappet wheel shaft 133 which, as hereinafter described is driven from the work spindle. The pin 126 is provided with a finger 136 against which the cam surfaces 134 and 135 on the cam 125 wipe. It will be clear from Figs. 1, 6 and 10 that when the shaft 133 makes a half revolution, the cam surface 134 will throw the clutch sleeve 124 in engagement with one of the gears 120, 121 and when the cam 125 makes its next half revolution, the cam surface 135 thereof will throw the clutch 124 in the opposite direction.

Since the work spindle *a* and the cam 125 is rotated through the clutch including the sleeve 124, it is necessary that the clutch sleeve 124 does not stop in neutral position, and to this end, the lever 127 (see Fig. 1) is provided with a V shaped projection 137 which is thrown beyond dead center by plunger 138 cooperating therewith.

The gears 121—123 when in mesh modify, so to speak, the speed selective mechanism which includes the gears 105. The gears 121, 123 are of a set of interchangeable gears, and may be conveniently replaced by other gears having a different ratio and thus the desired range of speeds may be obtained.

The drive of the tappet wheel *o* and the cams *k*, *l* and *l'* from the work spindle *a*, is as follows. Referring to Figs. 3 and 6, formed integral with the worm gear 55 or secured in any other suitable manner to the work spindle *a*, is a gear 150 which drives (through the gears 151 mounted on a stub shaft 152) a gear 153 fixed on a shaft 154 carrying the cam *k*. Also fixed on the shaft 154 is a gear 155 meshing with a similar gear 156 secured to the shaft 133 which, as stated, carries the tappet wheel *o*. This shaft is provided with bevel gears 157 (see Fig. 5) which mesh with respective gears 158 carried by the pins 40 on which the cams *l*, *l'* are fixed.

The clutch *s* which, as stated, results in driving the work spindle and cams at a fast rate of speed, is controlled through the escapement ratchet clutch mechanism *t* by the tappet wheel *o* in the following manner: Fixed on a freely rotatable shaft 160 within the casing or housing 67 (see Figs. 6 and 7) is a ratchet 161 and gear 162, the latter being in mesh with a gear 163 integral with the gear 92 which, as previously stated, is fixed to the loose clutch sleeve 77 of the clutch *s*. As the gear 163 is constantly driven the gear 162, ratchet wheel 161, and shaft 160 will also be driven. Loose upon the shaft 160 is a cam 164 which, upon rotation, shifts a shipper lever 165 to move the clutch sleeve 78 up and down on the shaft 65 and thereby engage and disengage the clutch *s*. Fixed to, so as to rotate with the cam 164, is a disc 166 carrying a spring pressed pawl 167, periodic engagement of which with the constantly rotating ratchet wheel 161 is controlled by an escapement yoke 168 having diametrically opposite stops 169 adapted to be brought alternately into the path of travel of the pawl 167 so that the cam 164 is intermittently rotated through angles of 180 degrees. The escapement yoke 168 is fixed to so as to move with, a rod 170. The outer end of this rod 170 is connected, as shown in Fig. 1, to a lever 171 having one arm pivotally connected to a rod 172. The extreme end of this rod 172 is connected to lever 173 one end, 174, of which constitutes a tappet controlled by the tappets 175 on the tappet wheel *o*. In the present instance the tappets 175 are arranged to successively throw the lever or tappet 173 in opposite directions to thereby alternately throw the clutch *s* in and out of engagement.

Reference will now be made to the constructions or the cams *k*, *l* and *l'* and their relation to each other and the tappet wheel. In the embodiment shown in Figs. 1 to 10 inclusive, the single cam *k* controls the longitudinal movement of both hobs. The cam *k* rotates in the direction of the arrow of Fig. 9, in which figure the relation of the tappet wheel and cams is clearly shown in a diagrammatic manner. Referring to this figure it will be seen that the cam *k* is provided with an inclined portion 180 which is operative in the present instance, to move the hobs longitudinally to the right, at a fast rate of speed so as to carry the right hand hob *e'* away from the piece of work which it has just threaded and the left hand hob *e* up to the work W; a pitch portion 181 operative while the left hand hob is performing its threading operation to feed the tools longitudinally at a rate of speed corresponding with the desired pitch to be cut during that operation; an inclined portion 182 for moving the tools longitudinally to the left and thereby longitudinally carry the left hand hob out of operative relation to the work after the threading operation has been completed and bring the right hand hob up into longitudinal relation with the new piece of work carried by the right hand end of the work spindle *a*; and a pitch portion 183 for moving the hobs longitudinally while the right hand hob is performing its threading operation. The pitch portions of the cam *k* are provided in suitable removable blocks 185. There will be as many sets of these interchangeable pitch blocks as there are numbers of different threads to be cut, within the capacity of the machine. The inclination of the grooves in these blocks will vary, of course, in accordance with the desired longitudinal feed of the tools. The inclination of the pitch groove for a right hand thread will be in one direction and for the left hand thread in the opposite direction, as respectively shown by full and dotted lines in Fig. 9.

The cams *l* and *l'* are similar in construction and operation. Referring to the cam *l* it will be seen that the groove of this cam has a straight, inactive portion 187 in which the follower 37 associated with the cross slide *g* of the left hand tool carriage engages while the tool carriages are being moved longitudinally up to and away from the pieces of work, and while the right hand hob *e'* is forming a thread; a short inclined portion 188 which feeds the left hand hob *e* laterally up to and into the work W after this hob has been brought into proper longitudinal relation relative to the left hand piece of work; an active portion 189 in which the follower associated with the left hand tool carriage rides during the threading operation performed by the left hand hob *e*; and a short return inclined portion 190 which moves the left hand tool laterally out of engagement with the work after the threading operation has been completed. Portions of the groove of the cam *l'* corresponding to similar portions of the cam *l* are indicated by like numerals which are primed for convenience in description. The pitch portions 181, 183, of the cam $k$ are diametrically opposite each other, and corresponding portions of the cams $l$, $l'$ are disposed at angles of 180 degrees apart.

To set up the machine where a single cam controls the longitudinal movement of both of the hobs, as in the embodiment of Figs. 1 to 10, the reversing clutches including the gears 46 for the respective hobs will be set so that the hobs are rotated in the desired directions depending upon whether external or internal threads are to be formed on the respective pieces of work. The gears within the transmission box $m$ are shifted to drive the hobs at a selected speed depending for instance on the kind of material of which the work is composed. The handle 111 will be shifted so as to set the selective speed mechanism, including the gears 105, in such position that the work spindle will be driven through the gears 120, 122 at a selected slow speed during the cutting operations of one of the tools upon the pieces of work carried by the corresponding end of the work spindle, this speed depending, for instance, on the diameter of the work. Where both tools are to operate upon pieces of work of like diameter the work spindle will be driven at the same selective speed during all threading operations. Where one tool is to cut a thread of one diameter, and the other tool a thread of a different diameter, the drive for one of the tools during its threading operations will be through the gears 120, 122, and the drive for the other hob, during its threading operations, will be through the change gears 121, 123. In one manner of speaking the change gears 121, 123, modify the selective speed gearing in accordance with the difference between the diameters of threads to be cut by the respective hobs. Pitch blocks having grooves 183, 181, corresponding to the pitches to be cut on the respective pieces of work held by opposite ends of the work spindle, will be inserted in the cam $k$; then a piece of work of one lot or job will be inserted in one end of the spindle and a piece of work of the other lot in the opposite end of the spindle. The arrangement 34 will be operated to adjust the left hand tool into proper longitudinal relation to the piece of work in the left hand end of the spindle and the bar 32 will then be clamped in adjusted position to the left hand slide $f$. Then the hand wheel 28 will be turned so as to adjust the right hand hob $e'$ relative to the work $W'$ and thereby (through the yoke $i$, carriage $f$ and bar 32) relative to the cam $k$, and then the yoke $i$ will be clamped in adjusted position to the right hand carriage $f'$ by the clamping screws 30.

Each of the hobs will be independently adjusted laterally relative to their respective operating cams $l$ and $l'$ in accordance with the diameters of the pieces of work to be operated upon as follows: The block 36 is unclamped from the guide 38 and the cam $l$ (or $l'$, as the case may be) is turned into a position where the short inactive portion 189 receives the follower 37, the screw 35 is then turned to move the cross slide $g$ to such position that the hob $e$ is just touching the piece of work. The cam $l$ is then turned until the follower 37 is in the groove portion 187 and the cam $k$ is turned through such an angle that the hob is advanced toward the axis of the work a distance equal to the depth of the thread to be cut, this distance varying, of course, with different pitches. The angle to which the screw 35 is turned may be determined by a dial $35^a$. The block 36 is now clamped to the slide $g$ by the bolt 39 and the tappets are properly adjusted on the tappet wheel to function at the correct times. In setting the tappets on the wheel it will be found of advantage to manually turn the tappet wheel and cams by means of a crank 193 adapted to be detachably connected to the worm shaft 57, as shown most clearly in Fig. 6. As shown in Fig. 9, a pair of tappets for each pitch portion of the cam $k$ is provided.

Assuming now that the parts have been properly adjusted to take care of the particular pieces of work at hand, a piece of work $W$ of one lot or job is fitted, for instance, into the left hand end of the work spindle $a$, and the power is thrown onto this spindle by manually throwing a lever 194 to engage the clutch comprising the parts 58, 59. Assuming that when the power is thrown on, the hobs are in the position shown in Fig. 1, the clutch $s$ has just been thrown in, and the follower 37 associated with the right hand slide $g'$ is in the inclined portion 190' of the cam $l'$, the cams $k$, $l$ and $l'$ will be driven at a fast rate of speed through the fast clutch $s$, which means that the inclined portion 190' of the cam $l'$ will quickly withdraw the right hand hob laterally from the work $W'$, and the inclined portion 180 of the cam $k$ will quickly move the hobs to the right so as to bring, with as little loss of time as possible, the left hand hob opposite to the left hand piece of work $W$, and during this time the follower 37 of the left hand cross slide $g$ is in the inactive portion 187 of the cam $l$. The work spindle and cams will be driven at a fast rate of speed until the follower 33 has entered the pitch portion 181 of the cam $k$ and the follower 37 has reached such position in the advancing portion 188 of the cam $l$ that the left hand hob $e$ is just about in engagement with the work $W$ and then the tappet 175 on the wheel $o$ will engage the tappet lever 173 and through this lever, the rod 172, lever 171, and escapement yoke 168 trip the escapement ratchet clutch mechanism t resulting in a half revolution of the cam 164 and the disengagement of the clutch s. The cams will now be driven at a slow selective speed through the overrunning clutch r and during this slow rotation of the cams, the remainder of inclined portion 188 of the cam l will feed the left hand hob e to the right depth into the work W, while the pitch portion 181 of the cam k is moving the tool in accordance with the pitch to be cut. After the hob e has been moved to the full depth into the work, the pitch portion 181 of the cam k moves the hob e longitudinally the distance of one thread, while the work spindle is making slightly more than one revolution. After this cutting operation has been completed the tappet 175$^a$ engages tappet lever 173 to again trip the escapement ratchet clutch mechanism t and throw the clutch s in. The cams will now be driven at a fast rate of speed to quickly withdraw the hob e laterally from the work W and then draw the hobs longitudinally to the left thus bringing the left hand hob into inoperative position, and the right hand hob e' opposite to the new piece of work W which has been inserted in the right hand chuck d while the left hand hob e was performing its threading operation. The cams will continue to rotate at a fast rate of speed until the follower 33 has entered the pitch portion 185 of the cam k and the follower 37' has entered the inclined portion 188' of the cam l', and when the hob e' has been brought laterally up to the work W', the tappet 175$^b$ engages the tappet lever 173 to trip the escapement ratchet clutch mechanism t and throw the clutch s out. The cams will now be driven at a slow speed and during this time the remainder of the inclined portion 188' of the cam l' will move the right hand hob e' into the work W' to the desired depth, the pitch portion 185 of the cam k will move the tools longitudinally in accordance with the pitch to be cut, and after the threading operation has been completed the tappet 175$^c$ will come into play to actuate the escapement clutch mechanism t and thereby throw the clutch s in, whereupon the work spindle and cams will be quickly driven. The sequence of movements is then repeated. While one of the tools is operating upon a piece of work in one end of the spindle, a new piece of work may be inserted in the opposite end of the spindle.

As stated the tappet wheel cams k, l and l' are all driven from the work spindle so that the ratio of the speed of rotation of these parts is always constant. The advantage of this arrangement is that the same pitch block on the cam k may be used for cutting a like pitch on pieces of work of different diameters. The same cams l and l' may be employed for feeding the respective tools up to and into the work irrespective of the pitches of the threads to be cut. Also, since the work spindle and cams for moving the hobs are driven, one from the other, back lash or loose movements are uniformly taken up and thus there are no inaccuracies resulting therefrom during the threading operations. By properly adjusting the tappets on the tappet wheel o, the extent to which the cams c, c' quickly move the tools up to the work and then slowly feed the tools into the work may be varied, at will, in accordance with the depth of the thread to be cut, which, of course, depends on the pitch; that is to say, the tappets may be adjusted so that the cams l, l', will quickly feed the tools up to the work through a greater distance and slowly feed the tools into the work to a lesser distance for cutting a shallow thread than would be the case where the hobs are employed to mill a deeper thread.

It will be seen that each of the hobs may be employed to cut either an internal or external thread, or a right or left handed thread. The direction of rotation of the hobs may be changed, at will, through the reversing clutches including the gears 46, it being preferable that these hobs rotate in such direction relative to the pieces of the work upon which they are operating that the tendency will be to force the tools downwardly whereby the cross slide and the main slide of each tool carriage are pressed against each other and the carriage is securely held to its seat on the base of the machine against play or vibration. If desired, one of the hobs may be employed to mill a thread of given diameter on one portion of a piece of work, and the other hob then used to mill a thread of different diameter on that piece of work; for instance, the hob e (referring to Fig. 1) may be employed to mill a thread on the head W$^x$ of the piece of work W, and then this piece of work may be chucked into the work holding device d' at the other end of the work spindle and in reverse position, and the hob e' may mill a thread of lesser diameter on the stem or body portion W$^y$ of the piece of work W; or, in some instances, it may be desired to form an external thread on one end of the piece of work by using one hob and an internal thread on the same piece of work on the same or opposite end by using the other hob e'. It will further be noted that since the tools are moved longitudinally they are, when in inoperative positions, spaced from the work spindle giving sufficient room for the operator to readily insert the pieces of work to be threaded into the chucks.

Reference will now be made to the embodiment of the invention shown in Fig. 11. In this embodiment instead of connecting the tool carriages together and moving them in unison longitudinally by a single cam $k$, the tool carriages are independent and their longitudinal movements are brought about by individual cams. The cam for longitudinally moving the left hand hob $e$ is designated by the character $k^1$ and the cam for moving the other hob is designated by the character $k^2$. Both of these cams are mounted on the shaft 154 and each is provided with a cam groove having, as shown in Fig. 12, a single pitch portion 200 operative while the hob is cutting a thread. This groove also has inclined portions 201 for moving the hob longitudinally up to the work and a return portion for moving the hob away from the work. In Fig. 11 the cams $k^1$ and $k^2$ are fixed on the shaft 154 in like angular positions. With the arrangement here illustrated when the machine is in operation, the tools are simultaneously fed toward each other up to the pieces of work on which they are to operate, and simultaneously away from each other after they have completed the threading operations.

It is, of course, understood that in this embodiment each of the cross slides will be controlled by cams corresponding to cams $l$ and $l'$, and these cams, together with cams $k^1$ and $k^2$ will be controlled through the tappet wheel $o$, as in the preceding embodiment.

In accordance with the provisions of the patent statutes I have prescribed the principles of operation of my invention together with the apparatus which I now consider to be the practical embodiments thereof, but I desire it to be understood that the machine is only illustrative, it being susceptible of various modifications and changes without departing from the scope of the appended claims.

I claim as my invention:

1. In a thread milling machine, a pair of longitudinally spaced apart rotary work holding devices, a pair of longitudinally spaced apart thread forming tools, automatically operated means for moving said tools longitudinally from one operative position to another relative to the respective work holding devices, then laterally, and then longitudinally during the threading operation, and means for manually adjusting said thread forming tools laterally relative to one another.

2. In a thread milling machine, a pair of longitudinally spaced apart rotary work holding devices adapted to carry separate pieces of work, a pair of longitudinally spaced apart thread forming hobs adapted to operate upon the respective pieces of work carried by said work holding devices, automatically operated means for moving said hobs longitudinally, and automatically operated means for moving said hobs radially, said hobs being manually adjustable relative to one another radially and longitudinally.

3. In a thread milling machine, a pair of longitudinally spaced apart rotary work holding devices adapted to carry separate pieces of work, a carriage movable longitudinally thereof, a pair of thread forming hobs carried by said carriage and spaced apart longitudinally and adapted to operate upon the pieces of work carried by the said respective devices, means for automatically moving said thread forming hobs radially of the pieces of work, a cam connected to said carriage for moving the thread forming hobs longitudinally of the work in accordance with the pitches to be cut, and means for manually adjusting said hobs laterally of one another.

4. In a thread milling machine, a pair of rotary work holding devices longitudinally spaced apart and in fixed position, a pair of thread cutters longitudinally spaced apart and in parallelism with said devices and with each other; means for manually adjusting said cutters longitudinally and radially with respect to one another, and mechanically operated means for longitudinally and laterally moving said cutters in timed relation relative to the respective work holding devices.

5. In a thread milling machine, a work spindle having a work holding device at each end, a pair of thread cutters adapted to operate on pieces of work respectively carried by said devices, and means driven in timed relation to said work holding devices for moving said cutters longitudinally and laterally into and out of operative relation to said respective work holding devices, said means also moving said cutters longitudinally during the cutting operations in accordance with the pitches of the threads to be cut.

6. In a thread milling machine, a work spindle in fixed position having a work holding device at each end, a main slide adjacent each end of, and movable longitudinally of, said spindle, an adjustable connection between said main slides, a cross slide on each main slide, a thread forming tool on each cross slide in parallelism with said spindle, means connected to said main slides for moving said tools longitudinally of said work holding devices, a cam connected to said cross slides for moving said cross slides radially of the respective pieces of work, and means for driving said cams and work holding devices in timed relation.

7. In a thread milling machine, a work spindle having a work holding device at each end, a pair of thread forming tools one to each end of, and in parallelism with, said spindle, means for longitudinally moving said thread forming tools to bring them into operative relation to the respective work holding devices and moving said tools longitudinally in accordance with the pitches to be cut during the threading operations, a cam for moving each of said tools radially relative to the respective work holding devices after the tools have been brought into longitudinal relation to the respective work holding devices and away from the respective work holding devices after the cutting operations have been completed, and means for driving said moving means and said cams in timed relation to each other and to said work holding devices.

8. In a thread milling machine, a pair of longitudinally spaced apart thread forming hobs, a pair of longitudinally spaced apart work holding devices interposed therebetween and respectively associated with said hobs, means driven in timed relation to said devices for moving said cutters longitudinally into and out of operative relation to the respective work holding devices and longitudinally during the cutting operations in accordance with the pitches of the threads to be cut, and means driven in timed relation to said work holding devices and said first mentioned means for moving said cutters laterally into and out of operative relation to the respective work holding devices.

9. In a thread milling machine, a work spindle having a work holding device at each end, a pair of thread cutters adapted to operate on pieces of work respectively carried by said devices, means for moving said cutters longitudinally and laterally into and out of operative relation to the respective work holding devices and longitudinally during the cutting operations in accordance with the pitches of the threads to be cut, and means for adjusting said tools longitudinally and laterally relative to said moving means.

10. In a thread milling machine, a work spindle having a work holding device at each end, a pair of carriages one to each end of said spindle and each comprising superimposed slides, a thread forming tool carried by each slide in parallelism with said spindle, means for moving said slides to feed said tools radially and longitudinally relative to the respective work holding devices, and means for adjusting said slides relative to said moving means.

11. In a thread milling machine, a work spindle having a work holding device at each end, a pair of thread forming tools one to each end of said spindle, cam means for feeding said tools longitudinally relative to the respective work holding devices, means for adjusting said tools longitudinally of said cam means, cams for moving said tools radially and independently relative to the respective devices, and means for adjusting said tools radially relative to said last mentioned cams.

12. In a thread milling machine, a work spindle in fixed position having a work holding device at each end, a main slide adjacent each end and movable longitudinally of said spindle, a cross slide on each main slide, a thread forming tool on each cross slide in parallelism with said spindle, cam means connected to said main slides for moving said tools longitudinally of the work holding devices, means for longitudinally adjusting said tools relative to said cam means, a cam connected to each cross slide for moving said slides radially of the respective pieces of work, and means for adjusting said cross slides relative to their respective cams.

13. In a thread milling machine, a pair of longitudinally spaced apart thread cutters, a pair of rotary work holding devices interposed therebetween and respectively associated with said cutters, means for longitudinally moving said tools in unison, and means for independently moving said tools laterally.

14. In a thread forming machine, a work spindle having a work holding device at each end, a pair of thread forming tools, one to each end of said spindle and in parallelism therewith, cam means for moving said tools longitudinally in unison, and cams for independently moving said tools radially.

15. In a thread milling machine, a work spindle having a work holding device at each end, a pair of thread forming tools one to each end of and in parallelism with said spindle, means for longitudinally moving said thread forming tools to alternately bring them into operative relation relative to the respective work holding devices and for moving said tools longitudinally in accordance with the pitches to be cut during the cutting operations, and a cam for moving each of said tools radially relative to the respective work holding devices after the respective tools have been brought into longitudinal relation thereto and away from the respective work holding devices after the cutting operations have been completed.

16. In a thread forming machine, a work spindle having a work holding device at each end, a pair of thread forming tools one to each end of said spindle and in parallelism therewith, means for moving said tools longitudinally in unison, means for longitudinally adjusting said tools relative to said moving means, means for independently moving said tools radially, and means for radially adjusting said tools relative to said last mentioned moving means.

17. In a thread forming machine, a work spindle having a work holding device at each end, a pair of thread forming tools one to each end of said spindle, cam means for feeding said tools longitudinally in unison relative to the respective work holding devices, means for adjusting each of said tools longitudinally of said cam means, cams for moving said tools radially and independently relative to the respective devices, and means for adjusting said tools radially and independently relative to said last mentioned cams.

18. In a thread milling machine, a work spindle in fixed position having a work holding device at each end, a main slide adjacent each end and movable longitudinally of said spindle, means for adjustably connecting said main slides together, a cross slide on each main slide, a thread forming tool on each cross slide in parallelism with said spindle, cam means adjustably connected to one of said main slides for moving said tools longitudinally of the work holding devices, a cam connected to each cross slide for moving said slides radially of the respective pieces of work, and means for adjusting said cross slides relative to the respective cams.

19. In a thread milling machine, a work spindle having a work holding device at each end, a pair of thread forming tools one to each end of said spindle, cam means for feeding said tools longitudinally relative to the respective work holding devices, cams for moving said tools radially and independently relative to the respective devices, and means including selective speed mechanism for driving said cams and work spindle at a constant ratio of speeds.

20. In a thread milling machine, a work spindle having a work holding device at each end, a pair of thread forming tools one to each end of said spindle, cam means for feeding said tools longitudinally relative to the respective work holding devices, cams for moving said tools radially and independently relative to the respective devices, and means for driving said spindle and cams at a constant ratio of speeds including automatically operated mechanism controlling the speed of the same.

21. In a thread milling machine, a work spindle having a work holding device at each end, a pair of thread forming tools one to each end of said spindle, cam means for feeding said tools longitudinally relative to the respective work holding devices, cams for moving said tools radially and independently relative to the respective devices, and means for driving said spindle and cams at a constant ratio of speeds including selective speed mechanism and automatically operated mechanism controlling the speed of rotation of the spindle and cams.

22. In a thread milling machine, a work spindle having a work holding device at each end, a pair of longitudinally spaced thread cutters one for operation upon the work carried by each work holding device, means for moving said cutters relative to said work holding devices, driving means for said spindle, and driving means for each of said thread cutters including reversing mechanism.

23. In a thread milling machine, a rotary work spindle in fixed position having a work holding device at each end, a pair of thread cutters in parallelism with each other and with said work spindle and one to each end of said spindle, means for moving said cutters relative to said work holding devices, means for driving said spindle and moving means, and means for rotating said tools including means for reversing the direction of rotation thereof.

24. In a thread milling machine, a work spindle having a work holding device at each end, a pair of longitudinally spaced rotary thread cutters one for operation upon the work carried by each work holding device, means for alternately bringing said cutters into operative relation to the respective work holding devices, and means including selective speed mechanism for driving said spindle at relatively low rates of speed during the cutting operations.

25. In a thread milling machine, a work spindle having a work holding device at each end, a pair of thread cutters one adjacent each end of said spindle, means for alternately bringing said cutters into operative relation to the respective work holding devices, means for driving said spindle including selective speed mechanism, and means for automatically changing the speed of rotation of said spindle from one selective speed to another in accordance with the difference between the diameters of the threads to be milled by the respective cutters.

26. In a thread milling machine, a rotary work spindle having a work holding device at each end, a pair of thread forming tools one at each end of said spindle, means for alternately bringing said tools into operative relation to the respective devices, means for driving said spindle at selective speeds, and means for automatically changing, while the tools are inoperative, the selective speed at which the spindle is driven whereby the spindle will be driven at one selective speed while one tool is operating and at another selective speed while the other tool is operating.

27. In a thread milling machine, a work spindle having a work holding device at each end, a pair of thread forming tools one associated with each of said devices, means for alternately bringing said tools into operative relation to said devices, means for driving said spindle at selective speeds, and means including change gears for automatically changing the selective speed at which the spindle is driven while the respective tools are operating.

28. In a thread milling machine, a spindle having a work holding device at each end, a pair of thread forming tools one associated with each device, means for alternately bringing said tools into operative relation to the respective devices, selective speed mechanism for driving said spindle, and means including a cam driven at a constant ratio of speed with said spindle for automatically changing the selective speed at which said spindle is driven.

29. In a thread milling machine, a spindle having a work holding device at each end, a pair of thread forming tools one associated with each device, cams for alternately bringing said tools into operative relation with the respective devices, means including selective speed mechanism for driving said spindle, means including a cam for automatically changing the selected speed at which said spindle is driving, and a positive driving connection between said spindle and all of said cams whereby the same are driven at a constant ratio of speeds.

30. In a thread milling machine, a spindle having a work holding device at each end, a pair of thread forming tools one associated with each device, cams for alternately bringing said tools into operative relation to the respective devices, means for driving said spindle including selective speed mechanism and automatically operated mechanism controlling the slow and hurry-up movements of said spindle, means including a cam for automatically changing the selected speed at which said spindle is driving, and positive driving connections between said spindle and cams whereby the same are driven at a constant ratio of speeds.

31. In a thread milling machine, a spindle having a work holding device at each end, a pair of thread forming tools one associated with each device, cams for alternately bringing said tools into operative relation to the respective devices, means for driving said spindle including selective speed mechanism and automatically operated mechanism controlling the slow and hurry-up movements of said spindle, a tappet wheel controlling said automatically operated mechanism controlling the slow and hurry-up movements of said spindle, means including a cam for automatically changing the selected speed at which said spindle is driven, and positive driving connections between said spindle, tappet wheel and cams whereby the same are driven at a constant ratio of speeds.

BENGT M. W. HANSON.